United States Patent
Yourlo et al.

(10) Patent No.: US 7,092,935 B2
(45) Date of Patent: Aug. 15, 2006

(54) CUSTOMIZABLE FILTER INTERFACE

(75) Inventors: Zhenya Alexander Yourlo, Roseville (AU); Cathryn Anne Chamley, Eastwood (AU); Andrew Timothy Robert Newman, Glebe (AU)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 09/788,398

(22) Filed: Feb. 21, 2001

(65) Prior Publication Data

US 2001/0025278 A1 Sep. 27, 2001

(30) Foreign Application Priority Data

Feb. 25, 2000 (AU) ................... PQ5851

(51) Int. Cl.
*G06F 17/30* (2006.01)
(52) U.S. Cl. .............. 707/3; 707/2; 707/4; 235/380; 235/492; 345/744; 705/9
(58) Field of Classification Search ............ 707/1–10; 345/810, 835, 968; 235/380, 492; 705/9, 705/10, 26
See application file for complete search history.

(56) References Cited

U.S. PATENT DOCUMENTS

| | | | | |
|---|---|---|---|---|
| 5,002,062 A | | 3/1991 | Suzuki | 128/696 |
| 5,220,604 A | * | 6/1993 | Gasser et al. | 707/9 |
| 5,276,311 A | * | 1/1994 | Hennige | 235/380 |
| 5,465,082 A | * | 11/1995 | Chaco | 235/382 |
| 5,600,781 A | | 2/1997 | Root et al. | 395/326 |
| 5,601,489 A | | 2/1997 | Komaki | 463/44 |
| 5,727,153 A | * | 3/1998 | Powell | 235/381 |
| 5,826,263 A | * | 10/1998 | Nakabayashi et al. | 707/7 |
| 5,832,488 A | * | 11/1998 | Eberhardt | 707/10 |
| 5,889,941 A | * | 3/1999 | Tushie et al. | 235/380 |
| 5,937,396 A | * | 8/1999 | Konya | 705/43 |
| 5,949,492 A | | 9/1999 | Mankovitz | 348/473 |
| 5,987,453 A | * | 11/1999 | Krishna et al. | 707/4 |
| 6,014,593 A | | 1/2000 | Grufman | 700/136 |
| 6,078,928 A | * | 6/2000 | Schnase et al. | 707/10 |
| 6,092,078 A | * | 7/2000 | Adolfsson | 707/102 |
| 6,229,694 B1 | | 5/2001 | Kono | 361/683 |
| 6,263,330 B1 | * | 7/2001 | Bessette | 707/4 |
| 6,385,309 B1 | * | 5/2002 | Bennett et al. | 379/93.25 |

(Continued)

FOREIGN PATENT DOCUMENTS

DE 3637684 5/1987

(Continued)

*Primary Examiner*—Jean Corrielus
*Assistant Examiner*—Anh Ly
(74) *Attorney, Agent, or Firm*—Fitzpatrick, Cella, Harper & Scinto

(57) ABSTRACT

A customizable data filter system is disclosed, that is adapted to reduce the dimension of a searchable data base (100), and to enable performance of a database search and/or a data item selection, in relation to the reduced search space. The system comprises a Portable Customizable data Filter and Interface (PCFI) (204) storing at least a base data filter parameter, and able to provide a user interface by means of user selectable icons. The system also comprises a reader (210) for the PCFI (204), and database processing means (214) responsive to the data filter parameter and a user icon selection, wherein the reduced search space is defined by the filter parameter, and the database search and/or the data item selection is performed using the selectable icons.

16 Claims, 18 Drawing Sheets

U.S. PATENT DOCUMENTS

| | | | |
|---|---|---|---|
| 6,454,173 B1 * | 9/2002 | Graves | 235/492 |
| 6,671,818 B1 * | 12/2003 | Mikurak | 714/4 |
| 6,965,868 B1 * | 11/2005 | Bednarek | 705/9 |
| 2001/0017616 A1 | 8/2001 | Kobayashi | 345/173 |
| 2001/0025278 A1 * | 9/2001 | Yourlo et al. | 707/2 |
| 2004/0050933 A1 * | 3/2004 | Keronen et al. | 235/380 |

FOREIGN PATENT DOCUMENTS

| | | |
|---|---|---|
| JP | 59-123986 | 7/1984 |
| JP | 04-088547 | 3/1992 |
| JP | U03-071329 | 6/2000 |
| WO | WO 87/07062 | 11/1987 |
| WO | 95/35534 | 12/1995 |

* cited by examiner

CUSTOMIZABLE FILTER INTERFACE

TECHNICAL FIELD OF THE INVENTION

The present invention relates generally to database searching, and in particular, to user interfaces in relation thereto.

BACKGROUND ART

Databases typically contain large volumes of data, and while this provides a user with access to significant resources which are searchable on-line, the very volume of the databases can make database searching cumbersome, slow and inconvenient. Software filters are often used in order to reduce a search space, thereby reducing time taken for a search. Traditionally, the user wishing to make use of a customisable filtered information service has required physical access to a personal computer (PC), or alternatively, to a web browser type of interface.

FIG. 1 depicts a data search space 100 within which a database search is to be conducted by the user (not shown) using a PC 102. A brute-force search of the data search space 100 is depicted by a bilateral arrow 104, this necessitating an exhaustive search of the data search space, typically a slow and inefficient process. This problem call be alleviated to some extent by using a software filter 106, depicted as a dashed box overlayed on a resultant alternative search procedure which is depicted by a bilateral arrow 110. This software filter 106 defines a reduced search space 108 within the original data search space 100, thereby enabling a reduced search 110 to be more rapidly conducted than the alternative 104. The traditional software filter 106 can be customised by the user by means of the PC, however as noted, the user requires physical access to the PC in order to define, and conduct the reduced search space search 110. A further disadvantage of creating software filters directly using PCs is a requirement to provide login and password information when accessing the PC.

As inter-data base connectivity becomes more prevalent, and as the number and variety of access points to databases proliferate, the need for a user to physically access a particular PC, or alternatively, to program another PC to define a customised software filter, represent impediments to the use of database search engines.

DISCLOSURE OF THE INVENTION

It is an object of the present invention to substantially overcome, or at least ameliorate, one or more disadvantages of existing arrangements.

According to a first aspect of the invention, there is provided a customisable data filter system adapted to reduce a dimension of a searchable data base and to perform one or more of a database search and a data item selection, in relation to a correspondingly reduced search space, said system comprising:

a Portable Customisable data Filter and Interface (PCFI) comprising a programmable smartcard adapted to store at least a data filter parameter, and further adapted to provide a user interface by means of spatially distributed user selectable icons made visible on a surface of the smartcard;

a reader means adapted to interface with said PCFI, and further adapted to discriminate an icon selected by a user; and database processing means adapted to interface with the reader means, said database processing means being responsive to said data filter parameter and detected icon selection; wherein said correspondingly reduced search space is defined by said filter parameter, and said one or more of the database search and the data item selection is performed using the selectable icons.

According to a second aspect of the invention, there is provided a method of customising a Portable Customisable data Filter and Interface (PCFI), said method comprising steps of:

interfacing a customising system to both said PCFI and a Portable Customisable User Interface (PCUI); and programming said PCFI by means of user instructions being input by means of the PCUI.

According to a third aspect of the invention, there is provided a method of customising a Portable Customisable data Filter and Interface (PCFI) comprising steps of:

interfacing a customising system to said PCFI; and programming said PCFI by means of user instructions being input to said customising system by means of predetermined control elements on the PCFI.

According to a fourth aspect of the invention, there is provided a Portable Customisable data Filter and Interface (PCFI) adapted to reduce a database search space, said PCFI comprising:

a programmable smartcard providing a user interface having spatially distributed user selectable icons made visible on a surface of the smartcard, wherein a selected icon is capable of discrimination by a smartcard reader to which the PCFI is connectable;

first and second data filter parameters; and a first rule adapted to define a third data filter parameter dependent upon said first and second data filter parameters.

According to a fifth aspect of the invention, there is provided a method of reducing a dimension of a searchable data base, and performing at least one of a database search and a data item selection, in relation to a correspondingly reduced search space, said method comprising steps of:

configuring a Portable Customisable data Filter and Interface (PCFI) comprising a programmable smartcard adapted to store at least a data filter parameter, and further adapted to provide a user interface by means of spatially distributed user selectable icons made visible on a surface of the smartcard;

interconnecting the PCFI to a searchable database;

selecting one or more of said user selectable icons;

defining the reduced search space dependent upon said filter parameter; and performing at least one of a database search and a data item selection, in relation to said reduced search space, dependent upon said selection.

According to a sixth aspect of the invention, there is provided a computer readable medium for storing a program for apparatus which reduces a dimension of a searchable data base and performs one or more of a database search and a data item selection, in relation to a correspondingly reduced search space, said program comprising:

code for a configuring step for configuring a Portable Customisable data Filter and Interface (PCFI) comprising a programmable smartcard adapted to store at least a data filter parameter, and further adapted to provide a user interface by means of spatially distributed user selectable icons made visible on a surface of the smartcard;

code for an interconnecting step for interconnecting the PCFI to a searchable database;

code for a selection step responsive to selection of one or more of said user selectable icons;

code for a defining step for defining the reduced search space dependent upon said filter parameter; and code for a database searching step and code for a data item selection step for performing at least one of a database search and a data item selection, in relation to said reduced search space, dependent upon said selection.

BRIEF DESCRIPTION OF THE DRAWINGS

A number of preferred embodiments of the present invention will now be described with reference to the drawings, in which.

DETAILED DESCRIPTION INCLUDING BEST MODE

Figure 1:
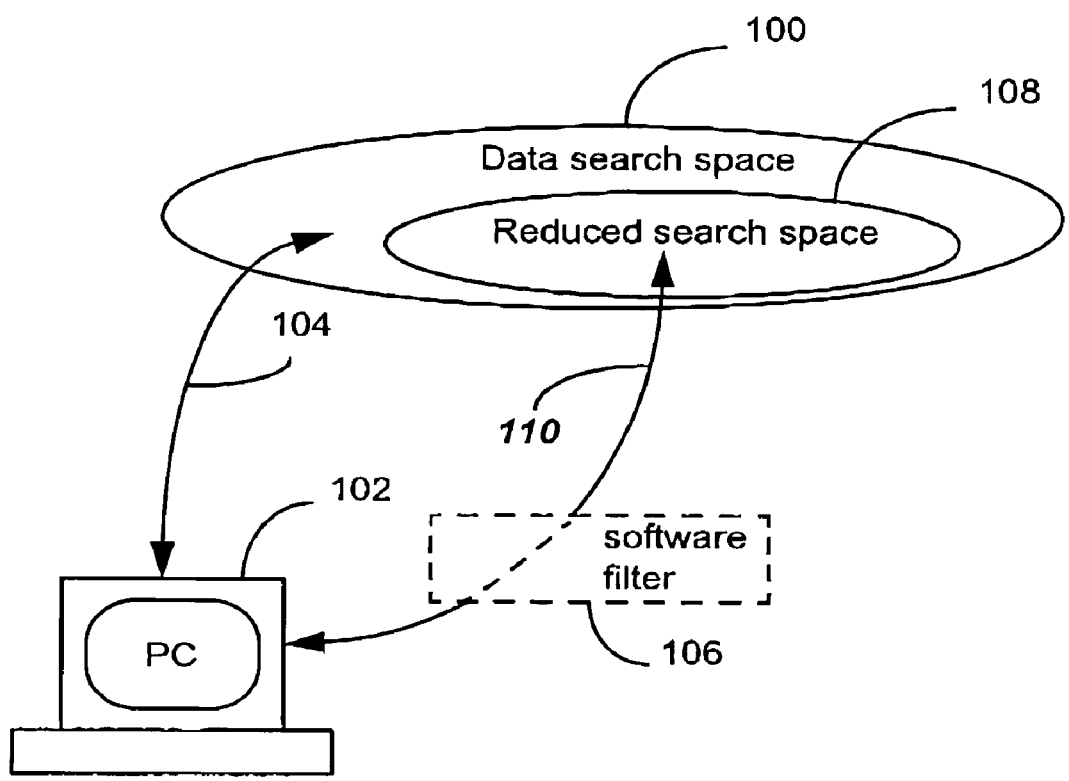
FIG. 1 shows traditional brute-force and filtered database searching.

Where reference is made in any one or more of the accompanying drawings to steps and/or features, which have the same reference numerals, those steps and/or features have, for the purposes of this description, the same function(s) or operation(s), unless the contrary intention appears.

Figure 2:
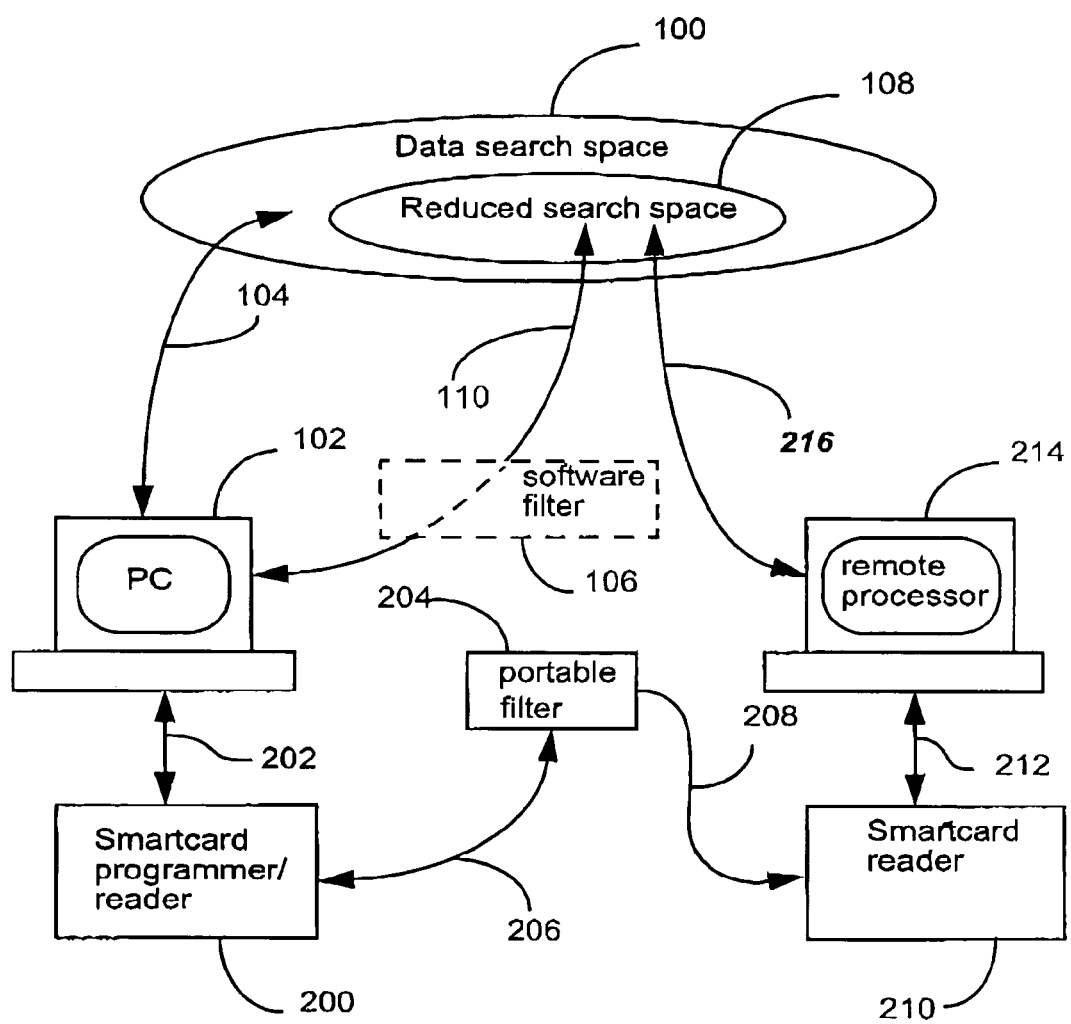
FIG. 2 illustrates a Portable Customisable data Filter and Interface (PCFI) according to a preferred embodiment of the present invention.

FIG. 2 shows a portable Customisable data Filter and Interface (PCFI) system in accordance with a preferred embodiment of the present invention. As was described with reference to FIG. 1, the overall data search space 100 can be searched in a traditional manner using the PC 102, the associated brute-force search being depicted by the bilateral arrow 104. Alternatively, the traditional software filter 106 can be programmed using an application in the PC 102, thereby facilitating the reduced search 110 which is conducted across the reduced search space 108. This description relates to the traditional arrangement.

In the preferred embodiment however, a smartcard programmer/reader 200 is connected to the PC 102 by a data connection 202, and a portable, customisable, data filter and interface (a PCFI) 204 can be produced, as depicted by an arrow 206. The PCFI 204 embodies customisation similar to that of the software filter 106, however in physical portable form, exemplified by a smartcard (for more detail see the description provided with respect to FIG. 7). The PCFI 204 can be inserted, as depicted by an arrow 208, into a smartcard reader 210 which is connected by a data connection 212 to a remote processor 214. The remote processor 214 can, in accord with PCFI attributes, conduct a reduced search as depicted by a bilateral arrow 216 in regard to the reduced search space 108. The PCFI is programmable, portable, and in addition, provides a convenient user interface. It can be customised with one of a multitude of desired software filter functions, and used on any remote device having a suitable PCFI interface (eg. 210).

Accordingly, the database searcher is no longer tied to a particular physical machine (eg. the PC 102) and furthermore, or alternately, has no need to perform cumbersome and irritating programming and customisation at a remote processor (eg. 214) when wishing to conduct a filtered database search from the corresponding location. The PCFI can provide a software filter function in a number of ways. For example, a desired software filter function can be incorporated directly onto the PCFI itself Alternatively, the PCFI can be provided with one or more references, these references "pointing" to software filter functions accessible elsewhere in the network (not shown). Implicit in the depiction of FIG. 2, is a network infrastructure by means of which database searching takes place. Accordingly, software filters can reside on a remote "filter server", to which a reference on the PCFI can point. This link between the PCFI filter reference and the remotely located software filter is advantageous, since it enables the remote filter to be updated from time to time, the PCFI having access to the updated filter when the PCFI is next activated.

The ability to customise the PCFI is advantageous when compared to the prior art, since the PCFI can be carried with the user, and made use of at any location in which an appropriate PCFI receptacle and display are present. Alternatively, the PCFI can be customised using mass production and programming techniques. Furthermore, each PCFI specification is represented by a physical token (ie. the specific PCFI in question) which can conveniently be visually tagged for recognition. This physical aspect of the PCFI provides users with a straightforward visual method for selecting, in a rapid and convenient manner, the particular PCFI being sought.

Figure 3:
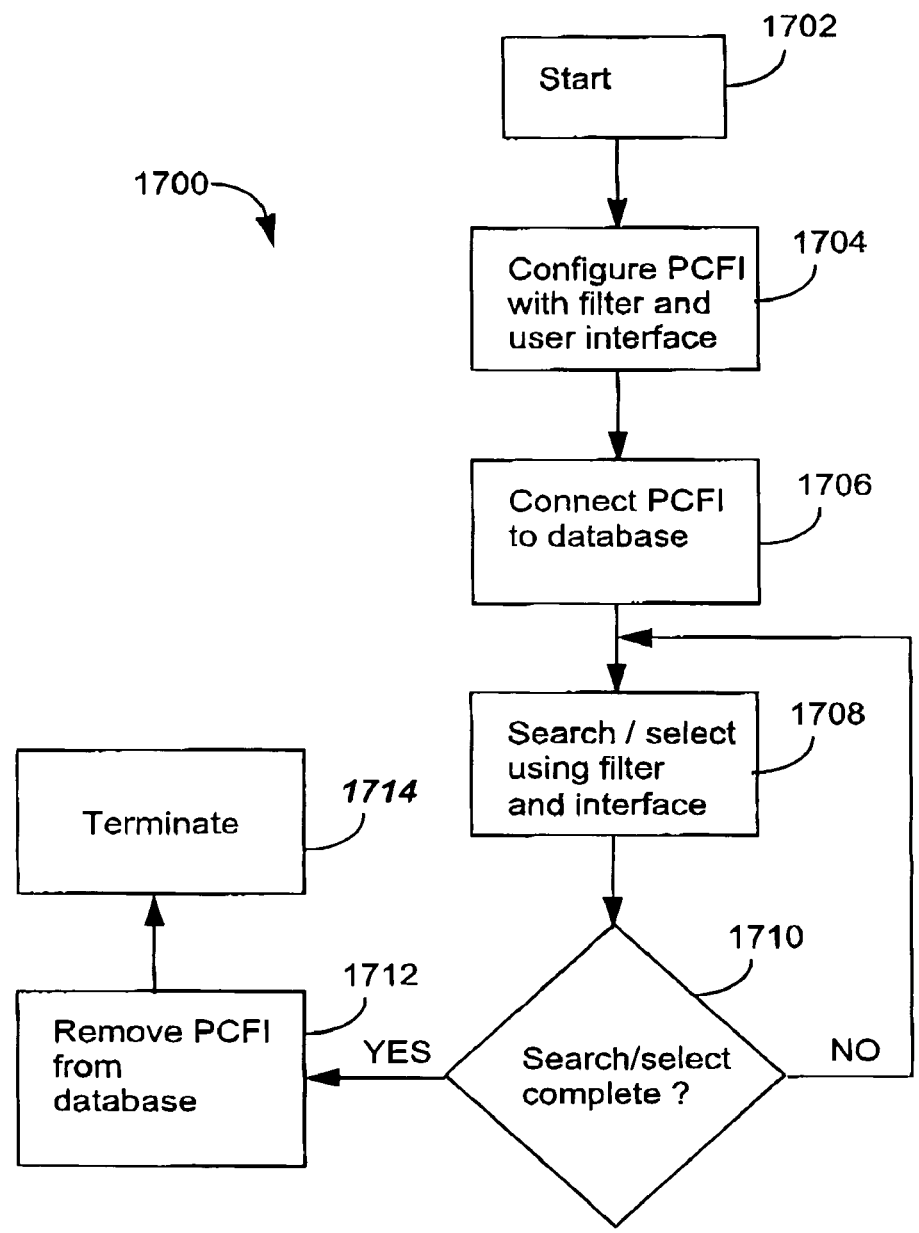
FIG. 3 shows a process in which a PCFI is used to search a database.

FIG. 3 shows a process 1700 in which a PCFI is used to search a database. The process 1700 commences with a step 1702, after which, in a step 1704 the PCFI is configured with desired filter attributes, and with a corresponding user interface. It is noted that the step 1704 is only performed, typically, at the beginning of the PCFI life, and is generally not repeated thereafter. The step 1704 has, however, been included in the process 1700 for completeness of operational descriptive. In a following step 1706, the PCFI is connected to the database which is to be searched. Thereafter, in a step 1708, the user searches the desired database and/or selects database items for display using the filter attributes on the PCFI and the user interface provided on the PCFI. In a following decision step 1710, the user is able to decide whether to continue the search, and if he or she decides to continue, the process 1700 is directed in accordance with a "NO" arrow to the step 1708. If, on the other hand, the user decides that the search is now complete, then the process 1700 is directed in accordance with a "YES" arrow to a step 1712, in which the PCFI is removed, ie. disconnected, from the database, after which the process 1700 terminates at a step 1714.

Programming Interface Options

A PCFI can be customised using different user interfaces, including (i) an external device and interface equipped with PCFI generation capabilities, (ii) a Portable Customisable User Interface (PCUI) in conjunction with an external device equipped with PCFI generation capabilities, and (iii) a subset of features on the PCFI itself. PCFIs are a sub-set of PCUIs, since the latter, while portable, able to be customised, and providing a user interface, do not necessarily provide data filter functionality. PCUIs are typically embodied in a form of a programmable smartcard as described in relation to FIG. 7. A PCFI can, in some cases, be used as a PCUI, provided that it supports necessary user interface functionality.

Figure 4:
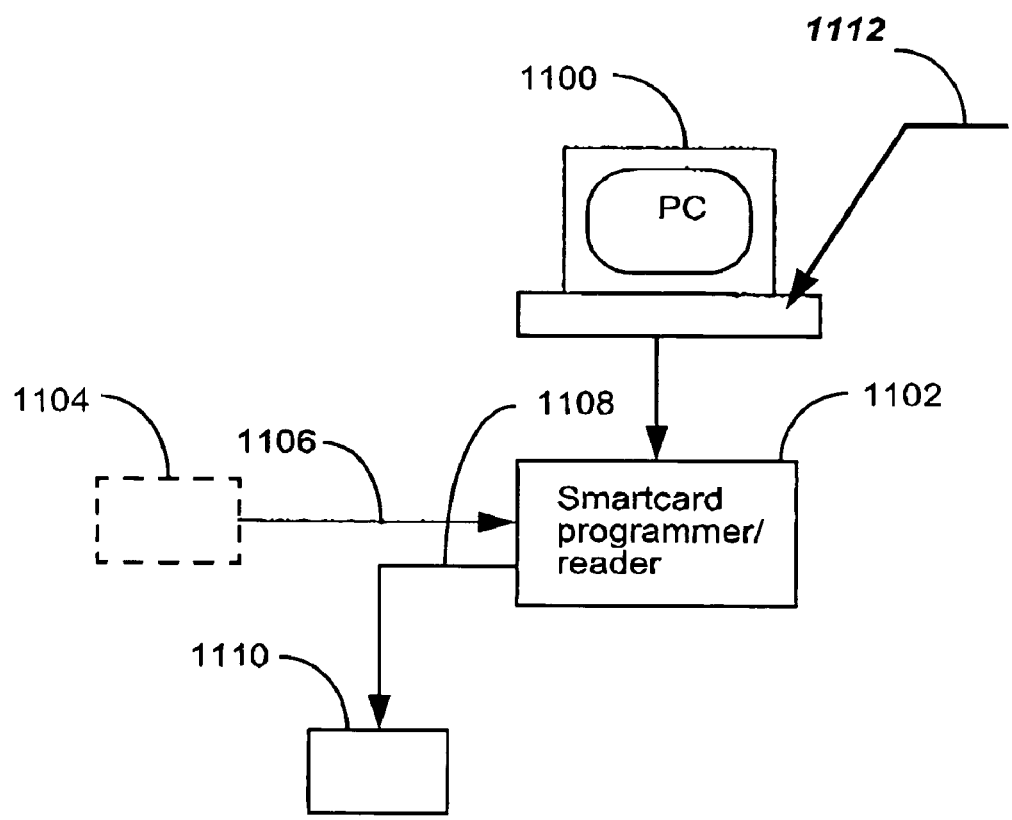
FIG. 4 depicts a system for customisation of a PCFI using a programming device having an integral user interface.

FIG. 4 illustrates a system for performing the first method for PCFI customisation, showing a "blank" PCFI 1104 being inserted as depicted by an arrow 1106 into a smartcard programmer/reader 1102, which is connected to a PC 1100. A user provides customisation information as depicted by an arrow 1112, and consequently a programmed ie, customised PCFI 1110 is produced by the smartcard programmer/reader 1102 as depicted by an arrow 1108. The PC provides both display and user interface capabilities, and supports an application which presents a representation of a programmable PCFI interface on the display of the PC 1100. The user enters a number of preference specifications as depicted by the arrow 1112, the specifications corresponding to parameters from which a desired software filter is to be constructed. Once the user is satisfied with the selections which have been made, the set of parameters which has been selected is used to generate a filter specific to the desired use, and to generate the customised PCFI 1110 for that use. The PCFI can be usually marked in some visually distinctive fashion, indicating the particular customisation which has been affected.

Figure 5:
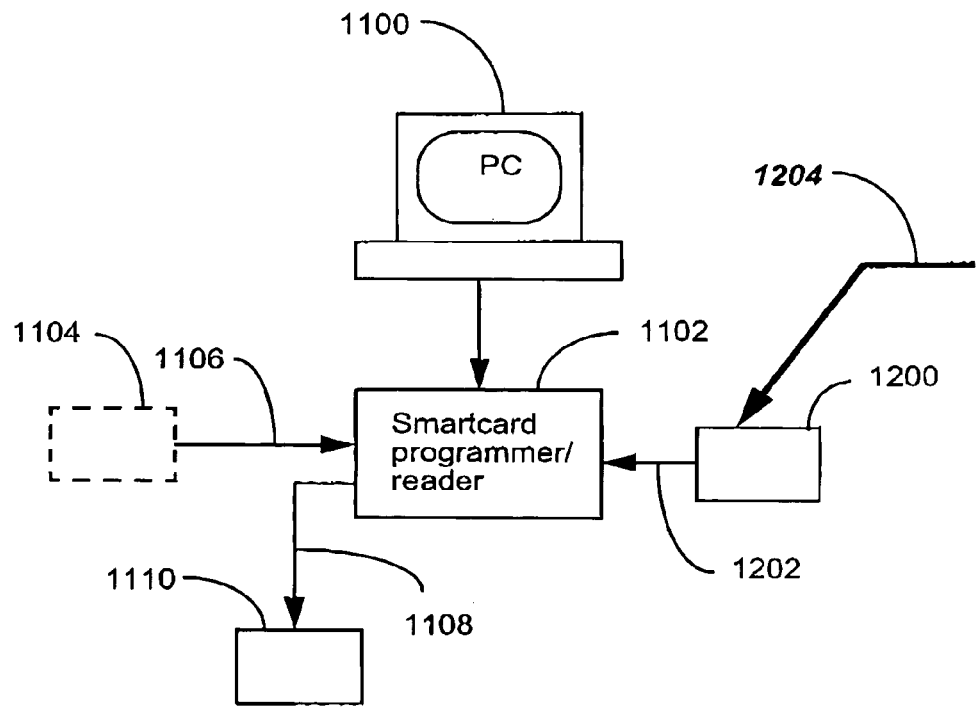
FIG. 5 depicts a system for customisation of a PCFI using a PCUI as a customer interface in conjunction with a programming device.

FIG. 5 depicts a system for using the second technique for PCFI customisation, whereby a PCUI 1200 provides a user interface by which a user can, as depicted by an arrow 1204, provide suitable customisation commands in order to produce the customised PCFI 1110. The PCUI 1200 is inserted as depicted by an arrow 1202 into the smartcard programmer/reader 1102, and performs as a user interface by which the user can provide customisation commands as depicted by the arrow 1204. In this instance, the PCUI 1200 provides equivalent interface functionality to that provided by the PC 1100 (see FIG. 4).

Figure 6:
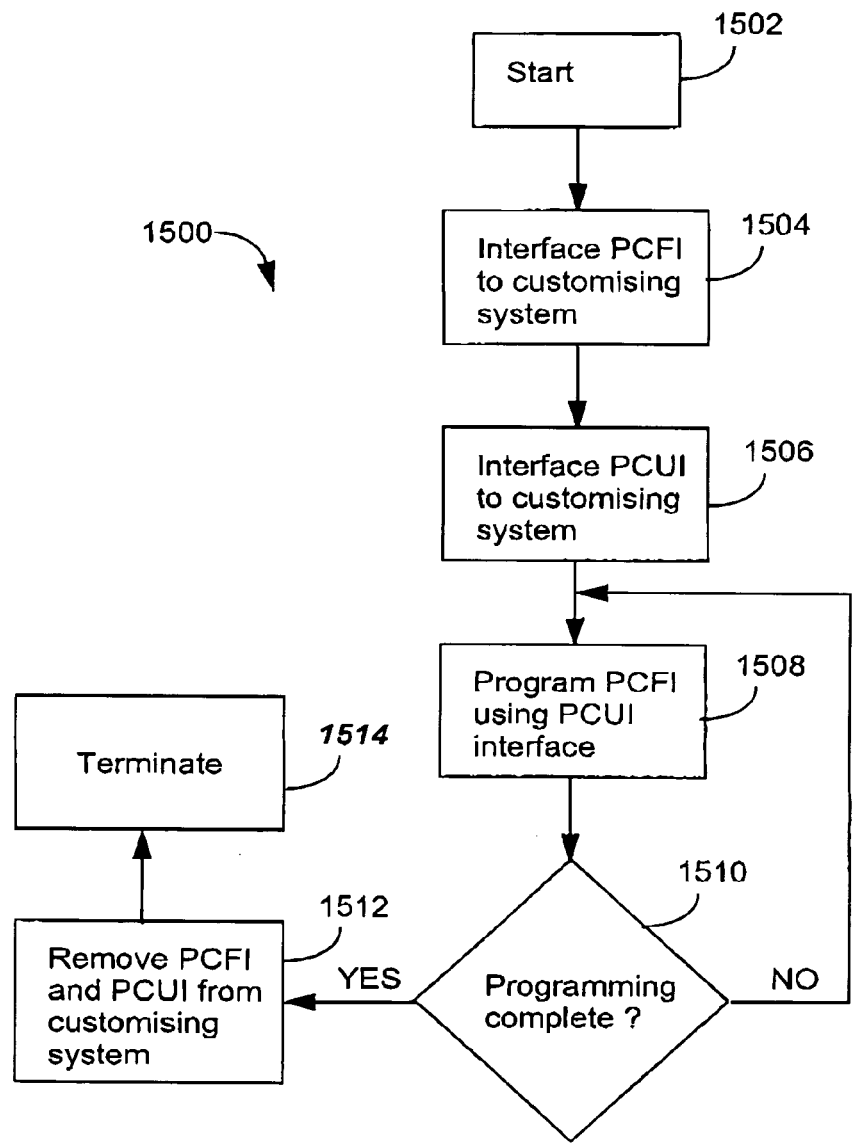
FIG. 6 shows a method for customising a PCFI using a PCUI to provide the necessary user interface.

FIG. 6 shows a method 1500 for customising a PCFI using a PCUI to provide the necessary user interface. The process 1500 commences with a start step 1502, after which, in a step 1504 the PCFI is interfaced to a customising system. Thereafter, in a step 1506, the PCUI is, in turn, interfaced to the customising system. The PCUI is used to provide a user interface to the user, by means of which the user can appropriately customise the PCFI.

In a following step 1508, the user performs programming of the PCFI using the PCUI interface, after which, in a decision step 1510, the user has an opportunity to consider whether programming has been completed. If programming has, indeed, been completed, then the process 1500 is directed in accordance with a "YES" arrow to a step 1512, in which the PCFI and PCUI are removed from the customising system, the process 1500 thereafter terminating in a step 1514. If, in contrast, it is determined at the decision step 1510 that programming is not yet complete, then the process 1500 is directed in accordance with a "NO" arrow to the step 1508 where further programming of the PCFI is performed.

Figure 7:
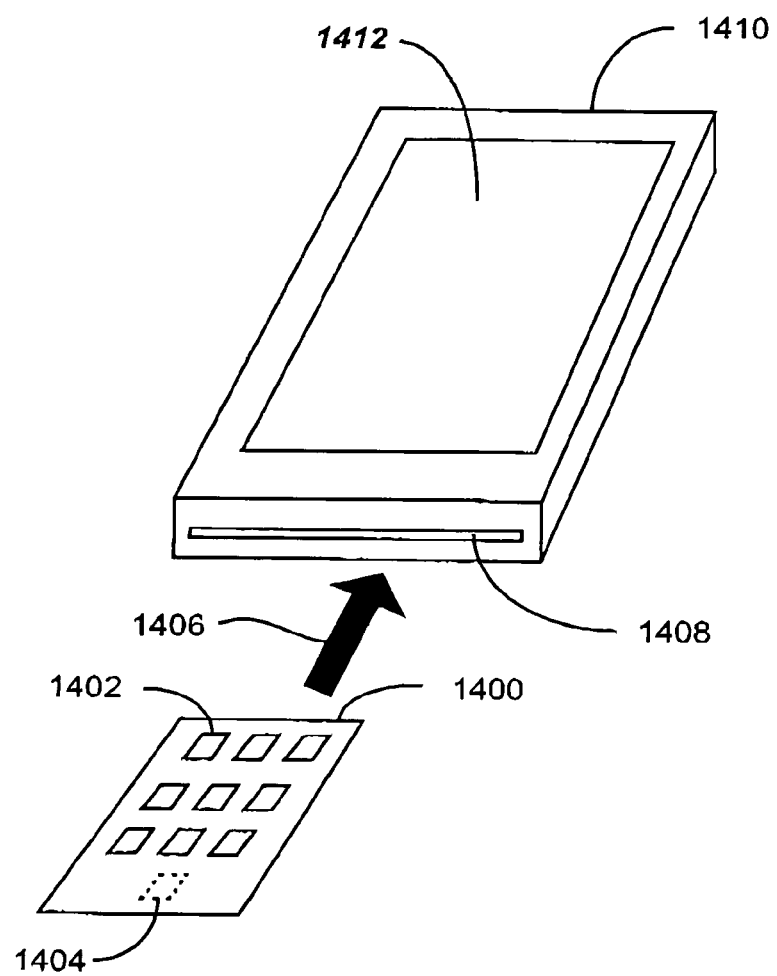
FIG. 7 shows a smartcard and a corresponding smartcard reader in accordance with the preferred embodiment.

FIG. 7 shows a representative smartcard 1400 which has visible icons eg. 1402 disposed on an upper surface of the smartcard 1400. In a first arrangement, the smartcard 1400 has a memory (not shown) conveniently disposed on the smartcard. This memory can take the form of either a solid-state memory chip, a magnetic stripe, or a barcode. In each of the aforementioned cases, appropriate reading devices are required in a smartcard reader, the reading devices making use of electrical contacts, a magnetic stripe reading device, or an optical bar-code reader respectively. Each visible icon, eg. 1402, is associated with a set of spatial coordinates denoting a spatial location of the icon 1402 on the surface of the smartcard 1400. The icon 1402 is also associated with a function which corresponds to the particular icon 1402. This coordinate/function pair is stored in the memory. In operation, when the smartcard 1400 is inserted into a suitable smartcard reader, a user touch to a particular icon can be detected by the smartcard reader (eg, by use of a touch-screen mechanism as described below), this touch-detection providing the spatial coordinates which the user has touched. The detected spatial coordinates are then used to reference data in the memory on the smartcard, in order to retrieve the associated function corresponding to the icon which has been touched. In this manner, a user can select one or more icons on the surface of the smartcard 1400, and a function corresponding to each selected icon can be retrieved from the on-card memory. In an alternate arrangement, the smartcard 1400 has a processor 1404 incorporating a memory disposed on an underneath surface of the card 1400. The processor 1404 is adapted to electrically interconnect with a smartcard reader 1410, after the smartcard 1400 is inserted as depicted by an arrow 1406 into an entry aperture 1408. The smartcard reader 1410 is provided with an aperture 1412 through which the upper surface of the smartcard 1400 is made visible. The icons 1402 are visible and accessible through the aperture 1412. The spatial location of each icon eg. 1402 is programmed into the smnacard processor 1404, (as well as a function corresponding to each icon), and a user selection of an icon, by pressing thereon, is detected by a touch-screen mechanism disposed in the aperture 1412. In this manner, a user can select an icon e.g 1402, this being detected and discriminated by the smartcard reader 1410, which is able to determine which icon has been pressed, and accordingly, which function is being specified.

In the context of FIG. 5, the smartcard programmer/reader 1102 is appropriately provided with the user interface aperture 1412 (see FIG. 7), thereby allowing the PCUI 1200 to be used as the customer interface for programming as depicted by the arrow 1204. The other aspects of producing the PCFI 1110 are the same as those described in relation to FIG. 4. When the user wishes to create the PCFI 1110, the user first inserts the PCUI into the smartcard programmer/reader 1102, thereby causing a corresponding customisation application to be initiated in the PC 1100. The customisation application presents the user with a number of preference specifications which may be modified to the user's satisfaction, using the PCUI 1200. Once the user is satisfied with the preferences selected, the user indicates this to the application, the application then proceeding to produce the customised PCFI 1110 which incorporates the specified filter parameters, and accordingly corresponds to the desired use, As described in relation to FIG. 4, the customised PCFI 1110 can be marked in a suitable visual fashion, in order to indicate the particular customisation which has been effected.

Figure 8:
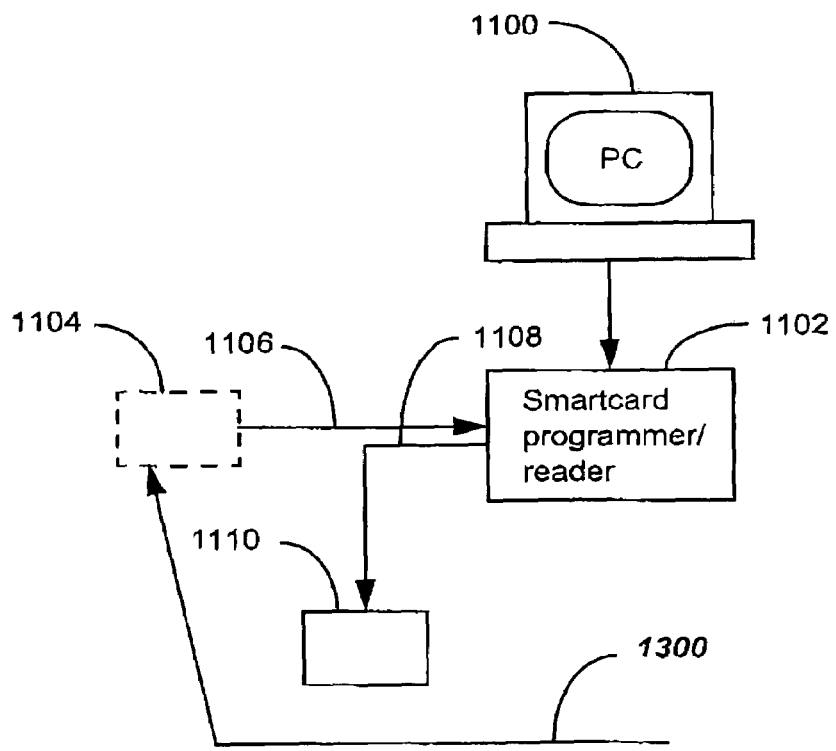
FIG. 8 depicts a system for customisation of a PCFI using customisation interface features on the PCFI itself in conjunction with a programming device.

FIG. 8 illustrates a system for performing the third technique for PCFI customization, where the PCFI to be programmed 1104 incorporates interface features which can be used to produce the customised PCFI 1110. The user inserts the blank PCFI 1104 into the smartcard programmer/reader 1102 (see FIG. 7 for details), this causing the PCFI application running on the PC 1100 to be activated. Although the unprogrammed PCFI 1104 is referred to as being "blank", in this instance, it contains a minimum set of customisation controls (ie. customisation icons), which the user can use in order to exercise pre-programmed control functions already existing on the otherwise unprogrammed PCFI 1104. This user interaction is depicted by an arrow 1300. The operation of the user on said control functions as depicted by the arrow 1300 has the effect of customising the behaviour of the application running on the PC 1100, by dynamically altering the parameters corresponding to the filter to be produced on the customised PCFI 1110.

Figure 9:
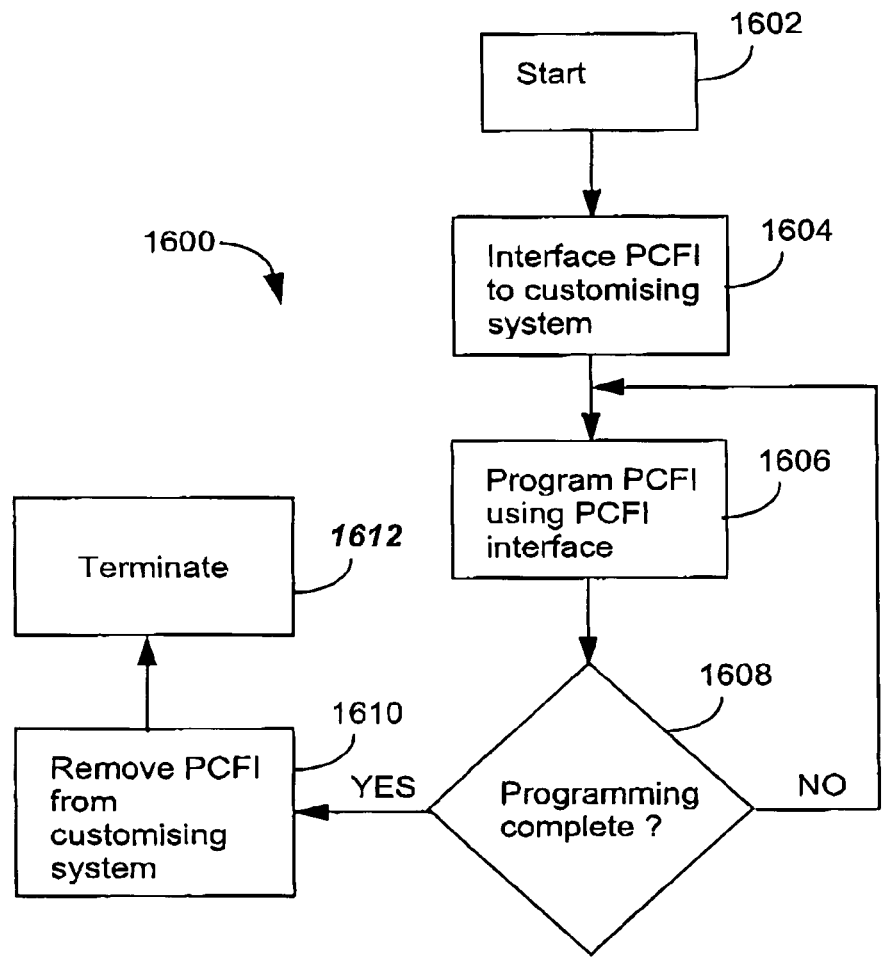
FIG. 9 shows a process of how a PCFI is customised using predetermined customising features provided on the PCFI itself.

FIG. 9 shows a method depicting how a PCFI can be customised using what are usually predetermined customising features provided on the PCFI itself. The process 1600 commences with a start step 1602, after which the PCFI to be customised is interfaced to the customising system in a step 1604. Thereafter, in a step 1606, the PCFI is programmed using a predetermined interface on the PCFI itself. In a following decision step 1608, the user is able to consider whether programming is complete, and in the event that further programming is not required, the process 1600 is directed in accordance with a "YES" arrow to a step 1610. The PCFI is removed from the customising system in the step, after which the process 1600 terminates at a step 1612. If, on the other hand, the user concludes at the decision step 1608 that further programing is desired, then the process 1600 is directed in accordance with a "NO" arrow to the step 1606 wherein further PCFI programming is performed.

Customization Process Options

Customisation of a PCFI can be achieved in a number of ways. In a first example, a user is presented with a number of filtering options. One option can be a hierarchical schema with certain options containing sub-options. Alternatively, a flat option format can be provided, in which each option is distinct from other options. Yet further, a format can be presented in which certain options are linked in some way either to each other, or to a combination of set presentations. An example of such a presentation can be considered in an application for purchasing show tickets, where a selection can exist which represents, for example, "City Nightlife". This "City Nightlife" option can be linked to settings for "venue", and in particular venue settings relating to city locations and times. The effect of this linkage is similar to that of a filter template, this template being capable of being updated externally when, for example, a new venue is opened. In this instance, a PCFI based on "City Nightlife" would be updated to include the new venue. Each of the aforementioned filtering options can be combined in an application-specific fashion, such as a Boolean expression, to form a filter defining boundaries of the reduced search-space in question.

A second process by which a PCFI can be defined is by adaptation to user preferences. In this approach, a user is presented with a succession of suggestions by a training application, and the user's responses are recorded. A learning function is then applied to these responses, extracting a set of parameters which correspond to the user preferences. These parameters are then used to form a filter defining boundaries of the information-space in question.

It is possible to encode a number of different filter parameter sets onto a PCFI, in such a manner that the different sets can be selected according to the needs of the user in an on-demand manner. This provides the user with increased control, at the time of the filtering transaction, over the type of filter being selected, and also over the manner in which the filter is applied to the data set. The PCFI is accordingly customisable, not only when initially creating the PCFI itself, but each time the PCFI is used.

When initially creating a PCFI of this type, a number of further steps must be added to each of the three PCFI creation techniques described in relation to FIGS. 11 to 14. These additional steps include specifying filters associated with control areas of the PCFI, and specifying the manner in which these filters can be combined to form the complete filtering function to be applied to the data set. This is described in more detail with reference to FIGS. 11 and 12.

Figure 10:
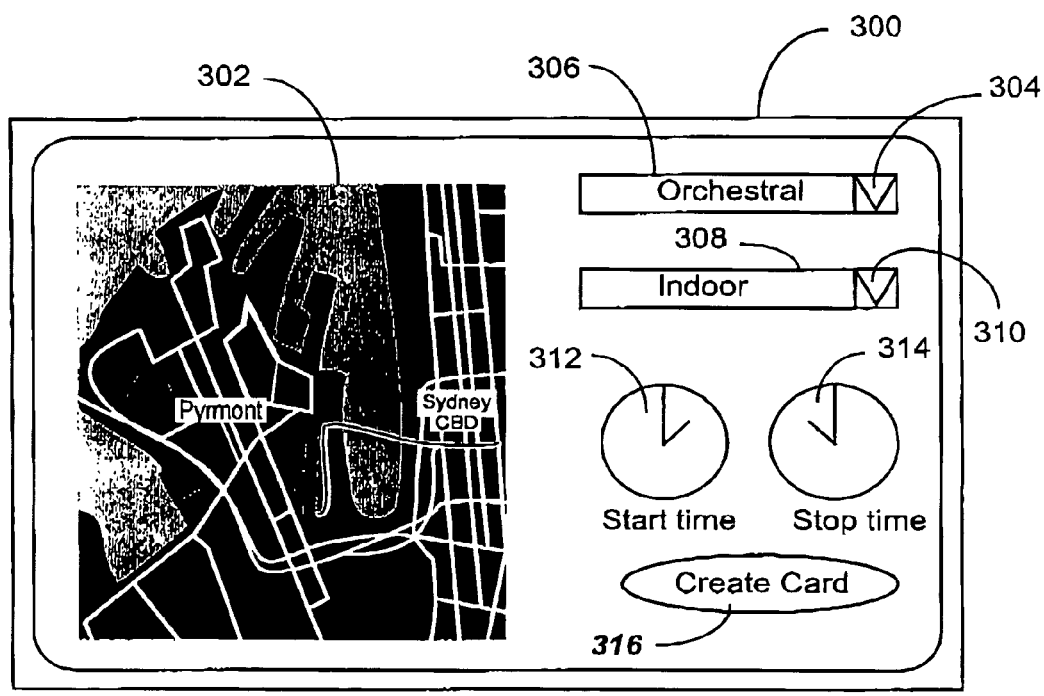
FIG. 10 shows a PC based customisation interface display for creating a PCFI on a PC.

A number of examples are now described, in order to further clarify the features of the various embodiments, FIG. 10 employs the customisation technique described in relation to FIG. 4 and accordingly shows a customisation interface display on the screen of the PC 1100 (see FIG. 4). In this example, a desired PCFI (not shown) is to be used in a ticket-ordering PCFI system relating to current events. The term system in this context refers, for example, to the system depicted in FIG. 2, as applied to the ticket-ordering example. With reference to an on-screen map 302, a user selects a set of event venues which are of interest. This restricts the data search space to those events which occur at only those specified venues. A time specification facility 312, 314 allows the user to specify the time period during which attendance of events is sought. This reduces the search space along a time dimension, in addition to the previous narrowing of the search space to a subset of available venues. Another parameter which the user can specify is the type of venue, as indicated by the textbox 308. Choice of the type of venue is provided by a drop-down menu selector 310. The type of venue can be either indoor or outdoor, a selection causing the search space to be further reduced by venue type. Yet another parameter which can be specified by the user is the type of event of interest, as depicted by a text box 306 and a drop-down menu tool 304. Types of event can include musicals, operas, orchestrals and so on. Selection of one event type causes the search space to be further reduced, allowing only events restricted to the particular type of event selected.

The combination of these user-specified parameters is used to construct a filter for the database of current events available to the ticket-ordering system. The PCFI produced by the aforementioned process can be inserted into a smartcard reader 200 attached to the user's own PC 102 (see FIG. 2), or into another appropriately programmed remote device, for example in the city entertainment area (eg. smartcard reader 210 and remote processor 214 in FIG. 2).

Figure 11:
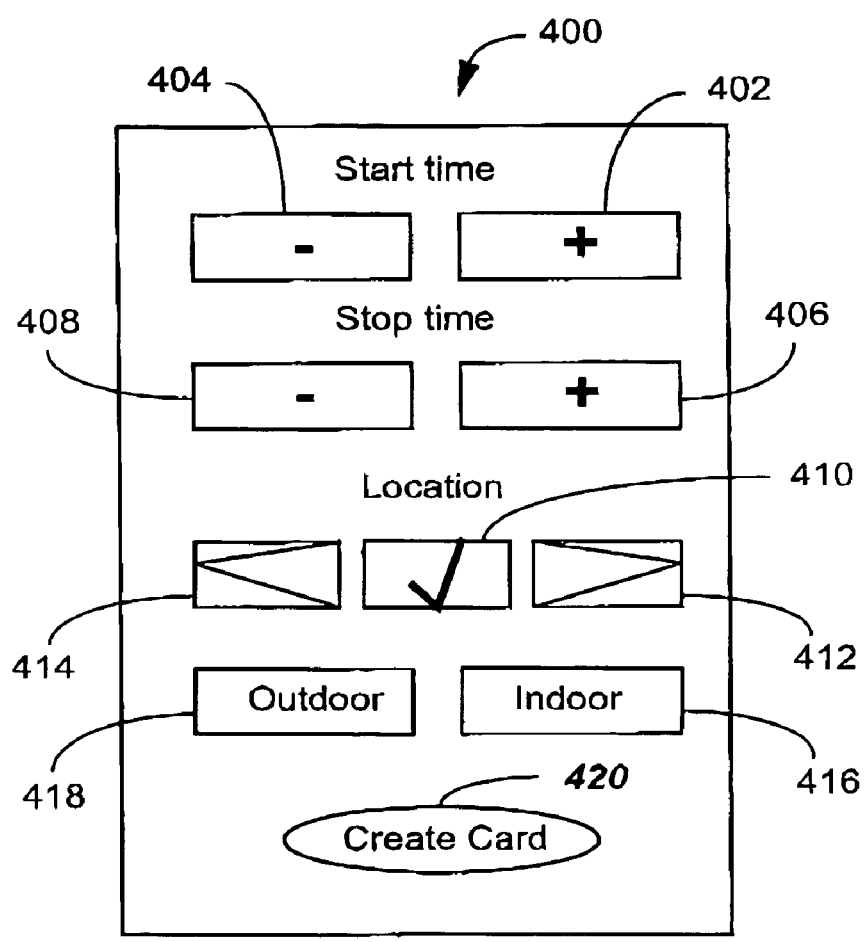
FIG. 11 shows a PCUI usable to program a ticket ordering PCFI.

FIG. 11 depicts a PCUI 400 which can be used to customise a PCFI (not shown), in accordance with the customisation technique described in relation to FIG. 5. The PCUI 400 provides similar functionality to the PC based user interface for customisation described in relation to FIG. 10. Accordingly, "start time" can be selected by icons 404 and 402, and similarly "stop time" can be controlled by icons 406 and 408. Venue selection can be assessed and navigated using navigation tools 412 and 414, and then selected using a selection icon 410. Indoor and outdoor preferences can similarly be selected using selection icons 416 and 418 respectively. Finally, once all the aforementioned parameters have been reviewed and appropriately selected, a card creation icon 420 can be selected in order to actually produce the desired PCFI.

Figure 12:
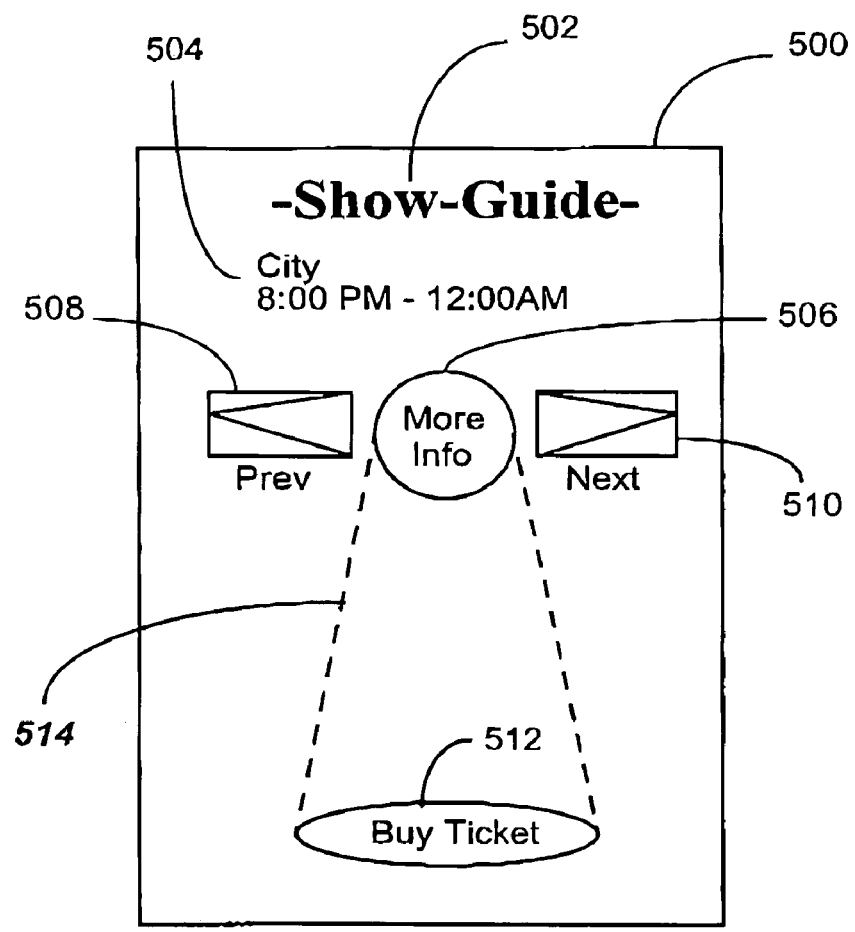
FIG. 12 shows an exemplary Show Guide PCFI.

FIG. 12 shows an exemplary PCFI supporting a "show-guide" filter and interface application, which has been produced by any one of the aforementioned PCFI production techniques. The PCFI filter can be constructed using one of many different formats, provided that the particular filter format chosen is compatible with the database being searched. One such format is a "name-value" pair, an example of which is as follows:

(location=city AND (start_time>=8PM OR
start_time<=12AM))

Using this format, a search filter can be constructed from individual search filter elements. For example, in FIG. 12, the basic search filter would have the following form:

(location=city AND (start_time>=8PM OR
start_time<=12AM))

This basic search filter can be combined with a "more-info" search filter, thereby returning more detailed information for the entertainment shows being considered The combined filter would, in the present instance, have the following format:

(info=detailed info) AND (location=city) AND
((start_time=>8PM) OR (start_time<12AM))

The above example is one of many possible formats that could be used, other possible formats including those in XML (Extended Markup Language) or SQL (Structured Query Language).

An exemplary format for a PCFI is provided in the following table, which shows card formats in the left hand column, and format explanations in the right hand column.

| FORMAT ON CARD | MEANING OF FORMAT |
|---|---|
| <card> | |
| <card-number></cardnumber> | The number used to uniquely identify the card |
| <filter></filter> | The card specific filter. Any icon specific filters will be combined with this filter. |
| <filter-operator> </filter-operator> | Specifies how any sub-filters should be combined. For example, if the operator is "AND", any active filters of icon groups will be "ANDed" together. |
| <icon-group> <name> (optional) <name> | The name of the icon group |
| <filter-operator> </filter-operator> | Specifies how the icon filters should be joined. |
| <icon> | A specific icon. |
| <filter>..... string ..... </filter> eg "price =$" </icon> </icon-group> <icon-group>...... </icon-group> </card> | The filter to be used when this specific icon is selected |

The PCFI 500 has a bold PCFI label 502. Further PCFI details are provided by the printed text 504 showing that the show-guide relates to city venues for events between the designated hours 8:00pm and 12.00am. The user can insert the PCFI 500 either into an appropriate smartcard reader 200 at his home PC 102 (see FIG. 2), or alternatively, the PCFI 500 can be portably carried on the users person, being inserted it into an appropriate smartcard reader 210 for processing by a suitable remote processor 214 at a central location in the city entertainment area (see FIG. 2). When the PCFI is inserted into the reader, the PCFI filter is applied to a given data set in order to provide the necessary data. This is explained in more detail in regard to FIG. 13. Upon inserting the PCFI into the appropriate reader, navigation controls 508, 510 can be used to navigate through a list of filter-matched events which are presented to the user on an appropriate display (eg. on the user's home PC 102, or a remote processor 214). Further information about a particular event can be obtained by the use of a control 506. Purchasing of tickets allowing entry to a selected event is accomplished by actuating the "buy ticket" control icon 512. It is apparent that the PCFI can be conveniently carried by the user, and used at a location and time of the user's choosing, to both check current events for which tickets can be purchased, and to purchase such tickets as desired.

Figure 13:
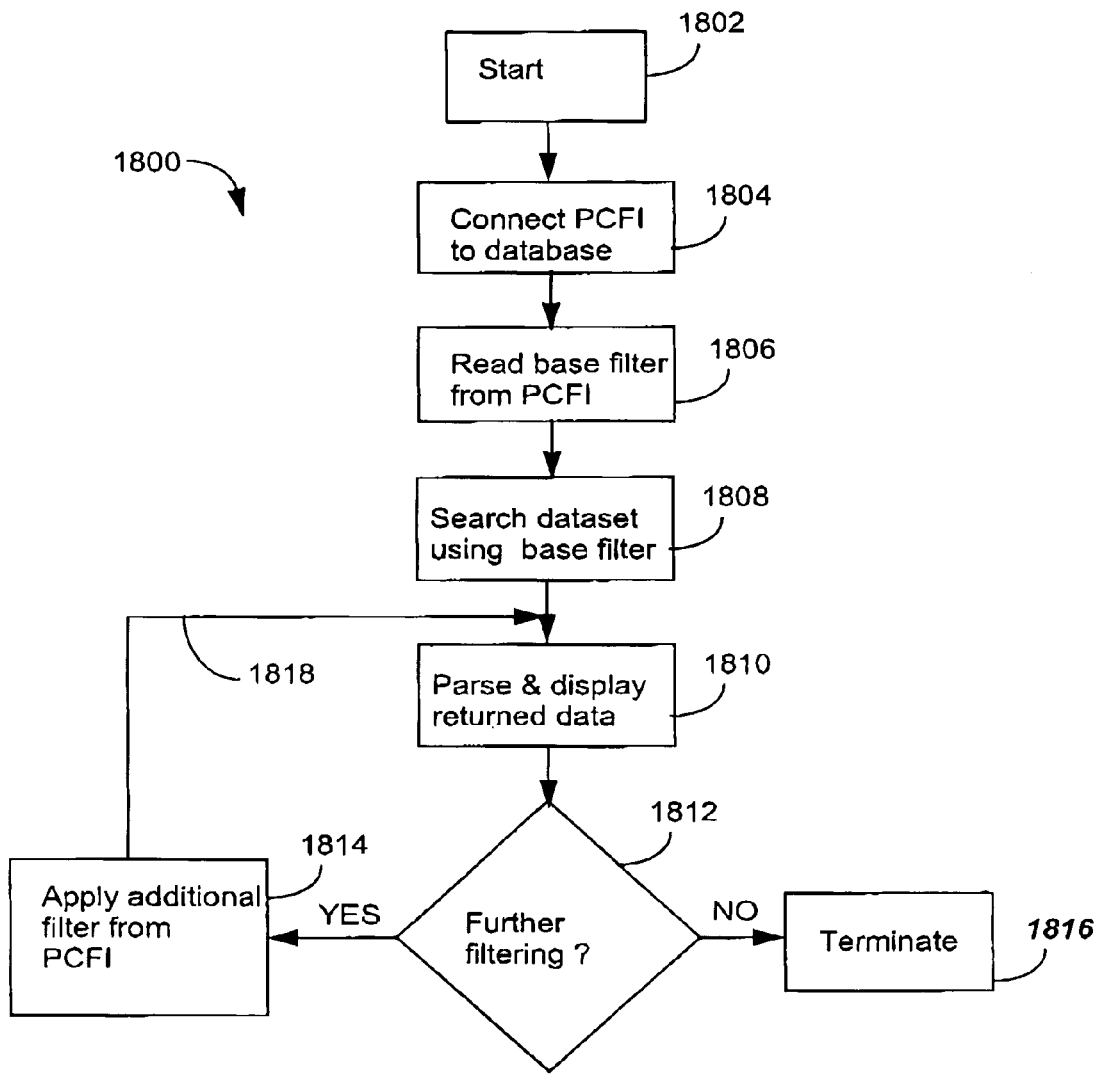
FIG. 13 shows a process in which a PCFI is used to search a database using to combined filters.

FIG. 13 shows a process 1800 in which the PCFI of FIG. 12 is used to search a city entertainment database. The process 1800 commences with a "start" step 1802, after which, in a step 1804 the PCFI is connected to the particular database to be searched. (The connection to the database is typically performed by inserting the PCFI into a suitably configured smartcard reader, as described in relation to FIG. 9). In a following step 1806, a base filter is read from the PCFI, noting that additional filter elements can be applied thereby combining the additional filter elements with the base filter. In a following step 1808, the data set is searched using the base filter from the PCFI. It is noted that the particular database being searched, ie. the particular data sets may be a database server, which may be accessed over the Internet, for example, using a CGI (Common Gateway Interface) script.

In a following step 1810, data results returned from the database are parsed and displayed to the user. The user then has the option, by means of a subsequent decision step 1812, of selecting further filtering, in which event the process 1800 is directed in accordance with a "YES" arrow to a step 1814 which uses additional filter parameters from the PCFI, generally in combination with the base filter, to further narrow the search space. The process 1800 is then directed, in accordance with an arrow 1818, to the step 1810. Returning to the decision step 1812, if the user does not require any further filtering, then the process 1800 is directed in accordance with a "NO" arrow to a termination step 1816.

Figure 14:
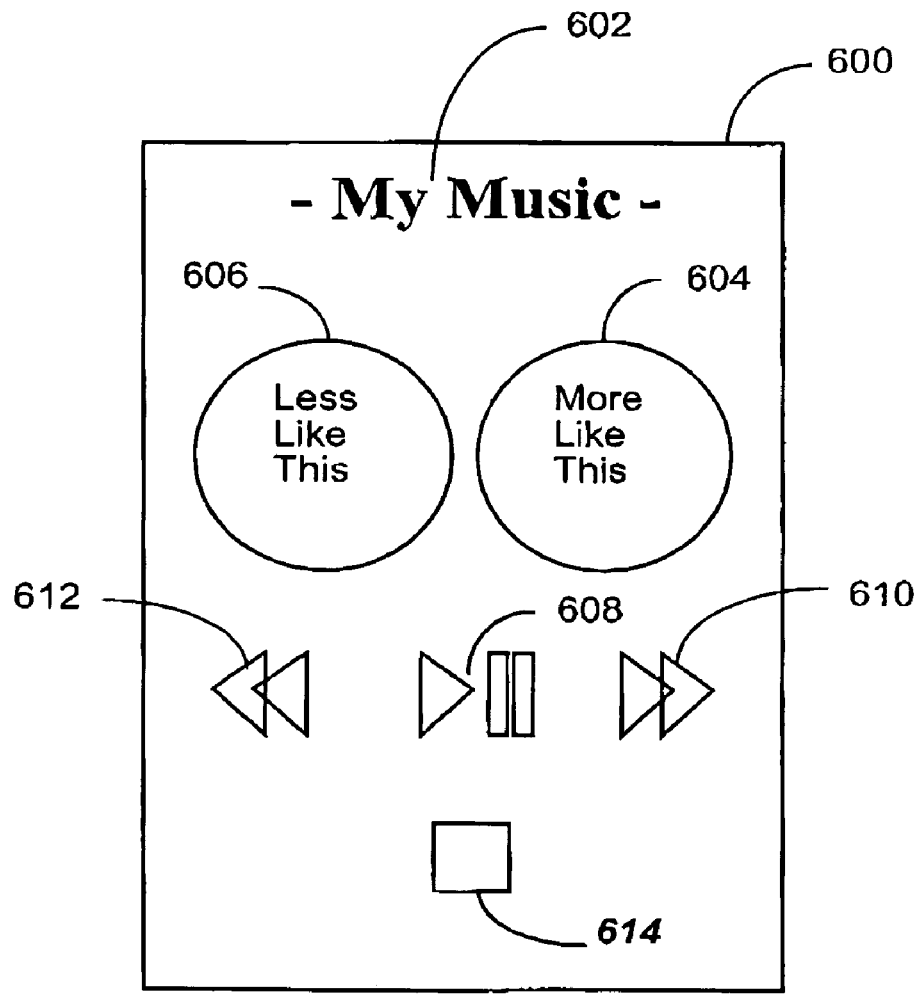
FIG. 14 shows a PCFI directed to music selection, using more complex filter customisation controls.

FIG. 14 provides an exemplary PCFI 600 for use in an on-line music delivery system. The on-line music delivery system provides streaming of music to the user's location, while providing CD-player style controls by means of icons 608 to 614. The music delivered to the user is consistent with a filter that has been either previously defined, or is dynamically customised by the user using control icons 606 and 604. In the present example, filter parameters used by the PCFI 600 are adaptable to user preferences through actuation of control icons 606 and 604. Control 606 customises the filter by causing music generally less similar to the currently playing music to be selected, while control 604 customises the filter by causing music which is generally more similar to the currently playing music to be selected.

Once the user has indicated a preference for a number of pieces of music, thereby establishing a baseline for preferred music type, then the music delivery system adapts subsequent selections of music to be consistent with the user's current musical preferences.

Figure 15:
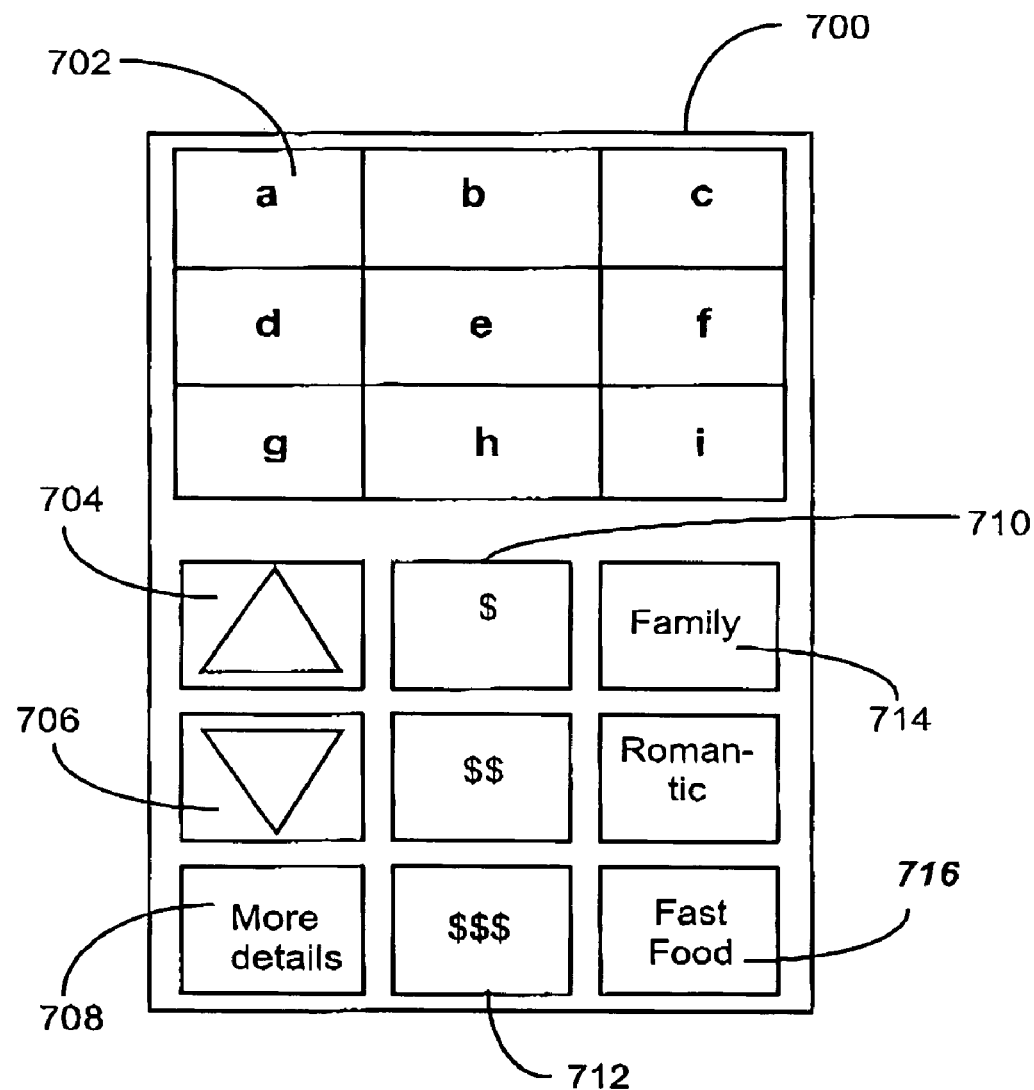
FIG. 15 depicts a PCFI providing a restaurant guide function.

FIG. 15 provides an example of a more complex PCFI 700, this being used in an on-line restaurant guide system, An on-line restaurant guide (not shown) has access to details about a very large number of restaurants, and can be used to provide recommendations comprising a limited set of restaurants which may be of interest to the user, based on parameters chosen by the user. A filter stored on the PCFI 700 is divided into a number of sub-filters, these being selectable and combinable to create a more complex filter reflecting the preferences of the user at a given time. An iconic representation of each filter is displayed on the face of the card, each icon corresponding to a control region as previously described in relation to FIG. 7. A geographic area is divided into a number of regions, eg. 702, each region icon being a PCFI control associated with a location filter for that region. Pressing on one of these region icons, eg. 702 causes the associated location filter to be combined with any other filter specified for this application, and consequently a filtering process is carried out with respect to a global data set associated with the restaurant guide application.

It is noted that a PCFI 700 has filter characteristics which are created both at the time of creating the PCFI 700 in the first instance, and in the present example, farther filter attributes which are adjustable at "run-time", ie. when the user selects the various control icons on the card. Accordingly, the aforementioned global data set undergoes a preliminary filtering when the PCFI is inserted into an appropriate receptacle (eg. smartcard reader 210 in FIG. 2). Thereafter, farther filtering takes place when the user selects the appropriate control icons. Continuing with the run-time controls, a number of other control icons 714 to 716 provide selection capability in regard to a style of restaurant, This can vary from a family style restaurant icon 714 to a fast food style restaurant icon 716. On selecting the family restaurant control icon 714, for example, a "family restaurant style" filter is combined with previously specified filters to provide farther filtering of the data set. Another group of control icons 710 to 712 provide control capability in regard to preferred price ranges for the restaurants. Finally, navigation controls 704 and 706 are provided for navigating through restaurants retrieved by the restaurant guide PCFI 700, which operates in accordance with filters as described previously which have been specified by the user. A control icon 708 allows the user to view more detailed information about a currently selected restaurant on the list.

The restaurant guide PCFI 700 can make use of sub-filters which are mutually exclusive, and alternatively, filters which can be combined in an inclusive manner. For example, filters relating to geographic regions are typically combined in an inclusive manner (ie. a Boolean "OR"),such that the restaurants displayed are located in one of the specified regions. In contrast, it would be appropriate to combine the style and price filters in a more restrictive manner (ie. a Boolean "AND"), such that a restaurant will be filtered out unless it satisfied both the style filter, and the price filter. Accordingly, if the "family" style is selected, and the "$$$" category is also selected, then only expensive family style restaurants are shown, and family restaurants which are inexpensive are not shown. Similarly, expensive restaurants that are not family style restaurants are also not shown.

Having regard to FIG. 15, an exemplary partial PCFI format for a configurable filter (ie a PCFI whose configuration depends upon what user selections are made at run time) is as follows:

```
<card>
    <filter>(type = restaurant AND location = city>
    </filter>
    <filter-operator> AND </filter-operator>
    <button-group>
        <filter-operator> OR </filter-operator>
        <name> price </name>
        <button>
            <X> 50 </X>
            <Y> 100 </Y>
            <filter> price = $ </filter>
            <width> 45 </width>
            <height> 30 </height>
        </button>
        .
        .
        .
        <button-group>
            <filter-operator><OR></filter-operator>
            <name> style </name>
        <button>
            <X> 100 </X>
            <Y> 100 </Y>
            <filter> style = family </filter>
            <width> 45 </width>
            <height> 30 </height>
        </button>
    </button-group>
</card>
```

Figure 16:
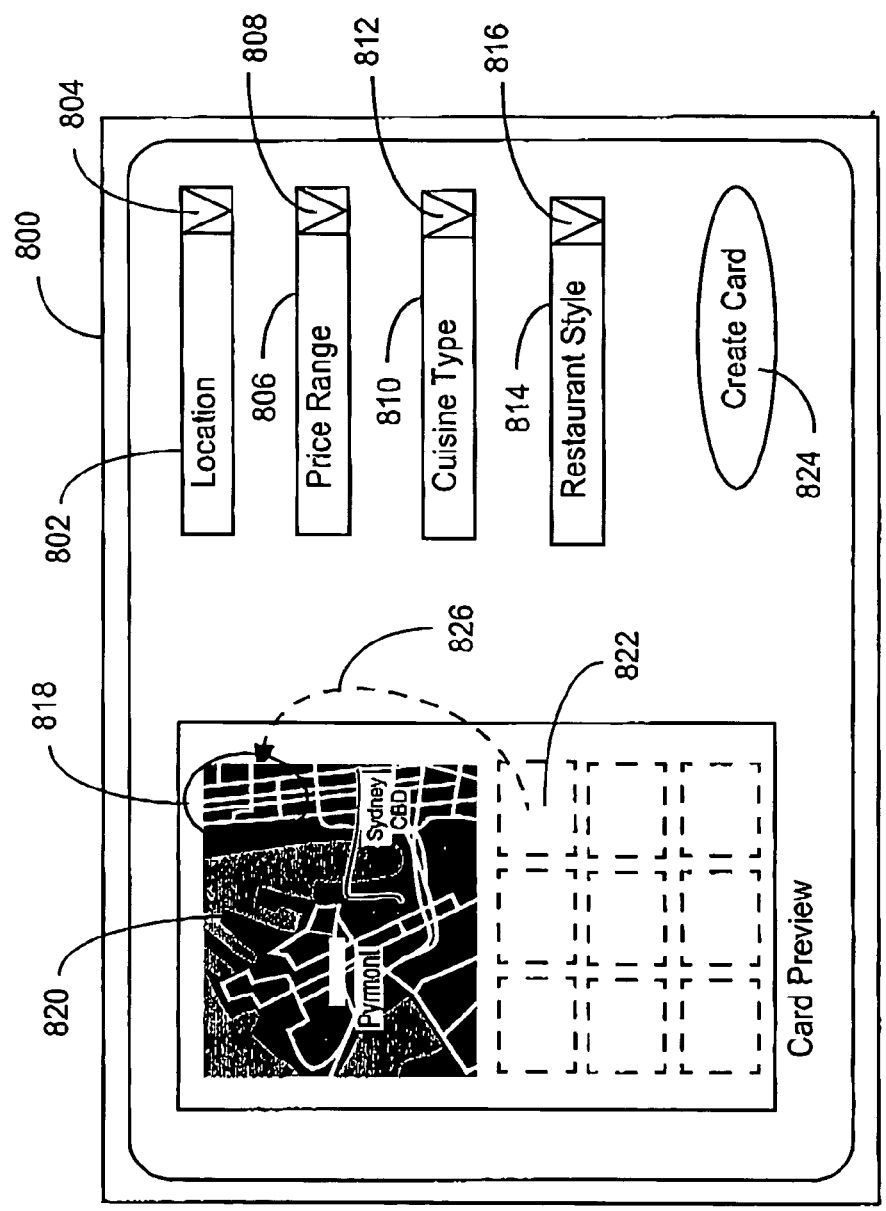
FIG. 16 depicts a PC based customisation interface display for creating the PCFI shown in FIG. 15.
Figure 17:
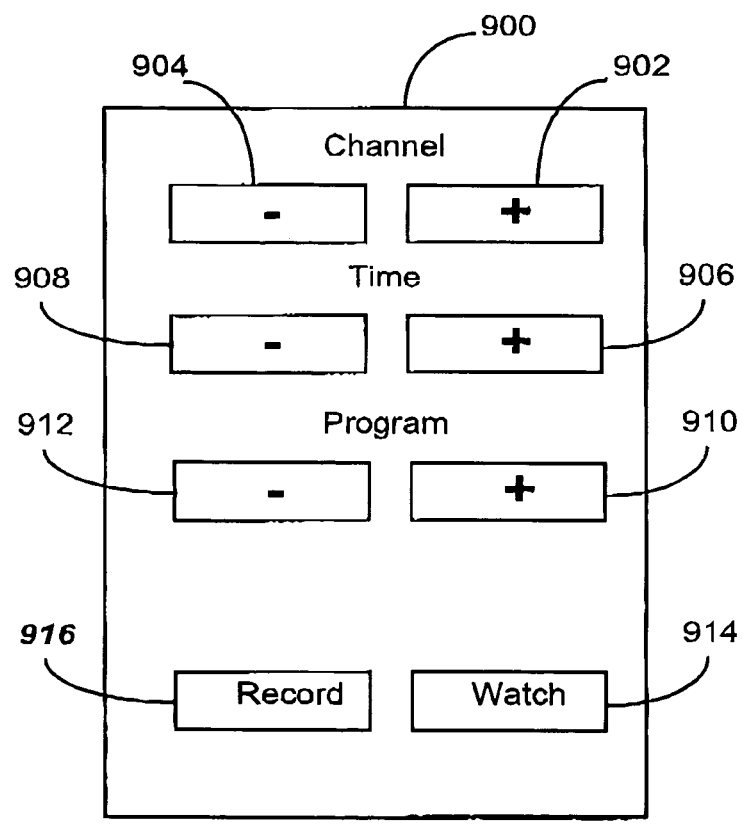
FIG. 17 shows a PCFI directed to TV channel selection and programming.

FIG. 16 depicts a customisation interface display on the screen of the PC 1100 (see FIG. 4) used in construction of the PCFI of FIG. 15, using the PCFI customisation technique described in relation to FIG. 4. A PC with a web style interface is used, with user interaction being driven primarily by mouse clicks. A PCFI construction application running on the PC provides an interface display 800, and displays controls for selecting PCFI attributes on the right hand side of the PC display 800. The first control 802 allows the user to specify a geographic location control icon, a drop-down menu control for locations being activated by a menu tool 804. The next three control icons 806, 810 and 814 are defined to provide additional attributes which can be selected by using drop-down menu tools 808, 812 and 816 respectively to expose options in each category. The user can add a geographic region filter attribute to the card by clicking on a selected geographic region 822, which corresponds to the upper right corner of the displayed map 820 as depicted by a dashed arrow 826. The PCFI user later selects desired filter attributes using the defined control icons 806, 810 and 814. When the user is satisfied with the filter attributes defined for the PCFI, the user can press the "create card" control icon 824, which causes the customised PCFI (eg. 700 in FIG. 15) to be created, being produced as described in relation to PCFI 1110 in FIG. 4, FIG. 17 shows another example of a PCFI 900 directed towards on-line electronic program guide applications, such as those used in conjunction with TV program selection. This PCFI 900 is usable in the system described in relation to FIG. 2, in which a TV and VCR (not shown) are connected to, and controled by, the PC 102. The PCFI 900 is used to display a filtered data space derived from an on-line electronic program guide database (not shown), and allows a user to navigate through the filtered program listings and perform control operations, such as selecting programs to be viewed or recorded. These control operations are performed using control function icons presented on the surface of the PCFI 900. Accordingly, channel navigation controls 902 and 904 allow channel selection, while time controls 906 and 908 allow selection of the desired time intervals. Programming controls 910 and 912 can be used to respectively add or subtract, programs to a VCR control list. Programs can be tagged for either watching (using an icon 914) or recording (using an icon 916) respectively. The programs listed in the filtered electronic program guide are restricted to those which match parameters encoded on the PCFI 900. This particular application of a PCFI is advantageous in modem TV environments, since these environments offer a very large number of channels, not all of which are to the taste of the viewer. The PCFI 900 can be customised to restrict the types of programs or channels which are listed in the electronic program guide, and thereby remove unwanted programs from the guide listing, substantially enhancing the utility of the program guide application from the user's point of view. The PCFI 900 can, in an alternate arrangement, be used to perform broad filtering into categories such as comedy, drama and sport, for example. Thus, a user could customise the PCFI 900 to select programs only from one of the aforementioned categories (eg. comedy), if the user is particularly interested in that genre.

The PCFI used to access the electronic program guide acts as a filter which selects entries from a general program guide database. The nature of this filtering can be controlled by a number of parameters which relate to aspects of the program listing, such as the program's broadcast time, its rating, subject matter or category, the names of cast members or any other information which may be stored in an electronic program guide database. Creating the PCFI 900 can be effected, for example, using a PCUI 1200 as a user interface, as described in relation to FIG. 5. One embodiment of the PCUI 1200 can allow a user to construct the PCFI 900 by selecting Boolean expressions, or tests, which are applied in turn to selected entries in the program database. Such a filter allows the user to restrict program guide listings to those entries which match all of the Boolean expressions so specified. Representations of the desired filter expressions are encoded on the, PCFI, and are applied when the PCFI is used to access the electronic program guide.

Other filtering approaches can be used to construct PCFIs for accessing the electronic program guide. Accordingly, PCFIs which encode pre-defined filtering expressions which select particular programs from the electronic program guide database can be directed for promotional purposes. In this embodiment, it is likely that the PCFI will be physically embossed with some form of advertisement or related material, which corresponds to the filter encoded on the PCFI. This visual representation combines the PCFI operational functions with the advertising material, in order to further enhance promotional aspects of the PCFI.

It is possible for PCFIs to have login and password information incorporated therein, thereby allowing faster and more convenient access to a PC than is normally the case when a user wishes to access a network. Furthermore, PCFIs can incorporate additional features, such as prepaid cash capabilities. These could, for example, be combined with the ticket-purchasing application, thereby providing further convenience.

Figure 18:
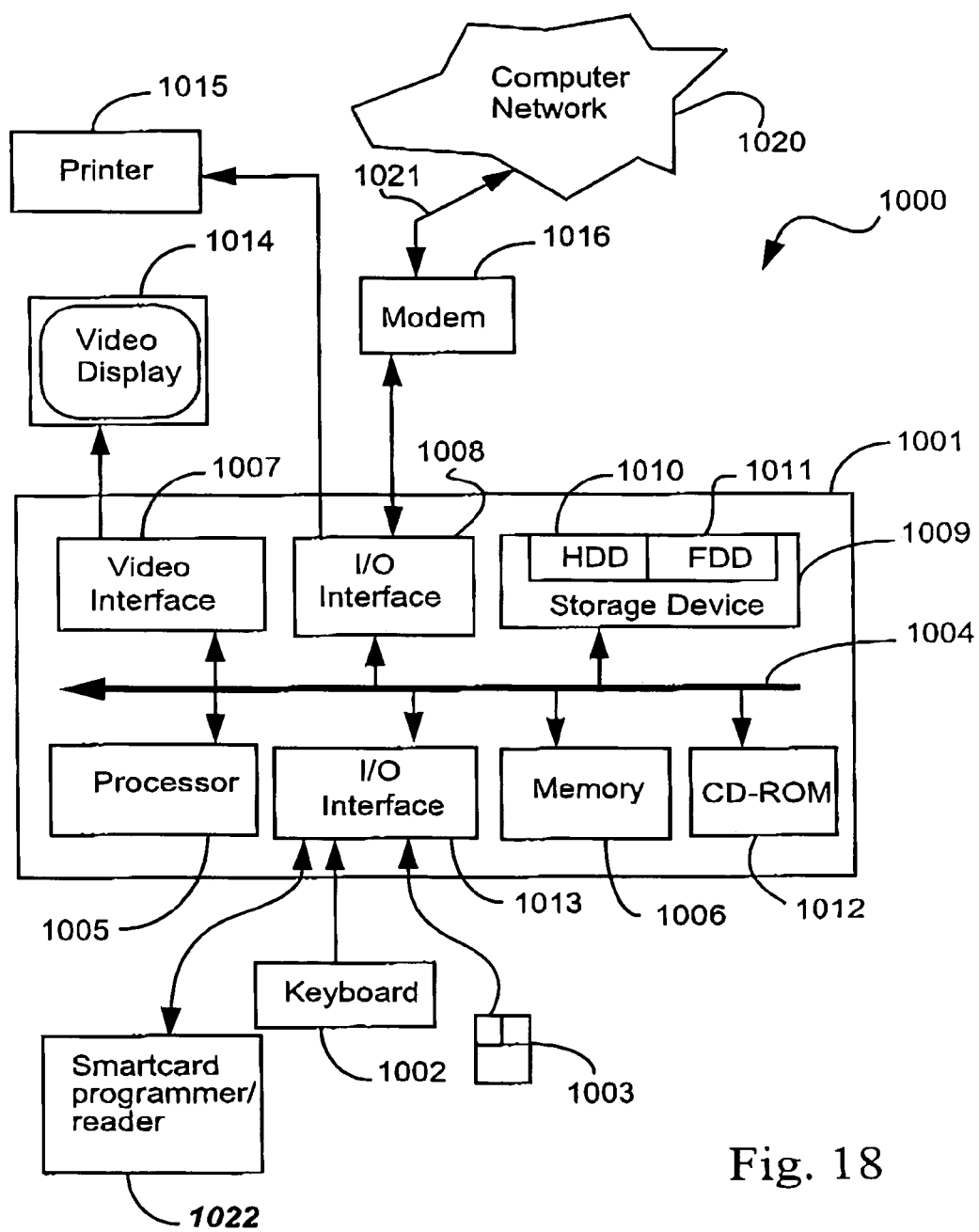
FIG. 18 is a schematic block diagram of a general purpose computer upon which the preferred embodiment of the present invention can be practiced.

The method of reducing a dimension of a database using a PCFI is preferably practiced using a conventional general-purpose computer system 1000, such as that shown in FIG. 18 wherein the processes described in relation to FIGS. 3, 6, 9 and 13 can be implemented as software, such as an application program executing within the computer system 1000. In particular, the steps of method of reducing a dimension of a database using a PCFI are effected by instructions in the software that are carried out by the computer. The software can be divided into two separate parts; one part for carrying out the reducing a dimension of a database using a PCFI, and another part to manage the User interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for a further disadvantage of creating software filters directly using PCs is a requirement to provide login and password information when accessing the PC in accordance with the embodiments of the invention.

The computer system 1000 comprises a computer module 1001, input devices such as a keyboard 1002 smartcard reader 1022, and mouse 1003, output devices including a printer 1015, smartcard programmer 1022 and a display device 1014. A Modulator-Demodulator (Modem) transceiver device 1016 is used by the computer module 1001 for communicating to and from a communications network 1020, for example connectable via a telephone line 1021 or other functional medium. The modern 1016 can be used to obtain access to the Internet, and other network systems, such as a Local Area Network (LAN) or a Wide Area Network (WAN).

The computer module 1001 typically includes at least one processor unit 1005, a memory unit 1006, for example formed from semiconductor random access memory (RAM) and read only memory (ROM), input/output (I/O) interfaces including a video interface 1007, and an I/O interface 1013 for the keyboard 1002, and mouse 1003 and optionally a joystick (not illustrated), and an interface 1008 for the modem 1016. A storage device 1009 is provided and typically includes a hard disk drive 1010 and a floppy disk drive 1011. A magnetic tape drive (not illustrated) can also be used. A CD-ROM drive 1012 is typically provided as a non-volatile source of data. The components 1005 to 1013 of the computer module 1001, typically communicate via an interconnected bus 1004 and in a manner which results in a conventional mode of operation of the computer system 1000 known to those in the relevant art. Examples of computers on which the embodiments can be practised include IBM-PC's and compatibles, Sun Sparcstations or alike computer systems evolved therefrom, Typically, the application program of the preferred embodiment is resident on the hard disk drive 1010 and read and controlled in its execution by the processor 1005. Intermediate storage of the program and any data fetched from the network 1020 can be accomplished using the semiconductor memory 1006, possibly in concert with the hard disk drive 1010. In some instances, the application program can be supplied to the user encoded on a CD-ROM or floppy disk and read via the corresponding drive 1012 or 1011, or alternatively can be read by the user from the network 1020 via the modem device 1016. Still further, the software can also be loaded into the computer system 1000 from other computer readable medium including magnetic tape, a ROM or integrated circuit, a magneto-optical disk, a radio or infra-red transmission channel between the computer module 1001 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of reducing a dimension of a database using a PCFI can alternatively be implemented in dedicated hardware such as one or more integrated circuits performing the functions or sub functions of reducing a dimension of a database using a PCFI. Such dedicated hardware may include graphic processors, digital signal processors, or one or more microprocessors and associated memories.

INDUSTRIAL APPLICABILITY

It is apparent from the above that the embodiment(s) of the invention are applicable to the field of automatic transactions in general, and electronic commerce in particular.

The foregoing describes only some embodiments of the present invention, and modifications and/or changes can be made thereto without departing from the scope and spirit of the invention, the embodiments being illustrative and not restrictive.

The invention claimed is:

1. A customisable data filter system adapted to reduce a dimension of, a searchable data base and to perform one or more of a database search and a data item selection, in relation to the correspondingly reduced search space, said system comprising:
   a Portable Customisable data Filter and Interface (PCFM) comprising a programmable smartcard adapted to store at least a data filter parameter, and further adapted to provide a user interface comprising spatially distributed user selectable icons made visible on a surface of the smartcard;
   a reader means adapted to interface with the inserted PCFI's smartcard, the reader means having a touch screen adapted to allow user viewing and selection of said icons of the inserted smartcard, the reader being adapted to identify an icon selected by a user on the inserted smartcard in user interaction with said touch screen; and
   database processing means adapted to interface with the reader means, said database processing means being adapted to (a) establish the correspondingly reduced search space dependent upon the filter parameter of the inserted smartcard, and (b) to perform one or more of the database search and the data item selection dependent upon icons selected from the inserted smartcard;
   wherein said data filter parameter comprises a base filter parameter, and wherein the PCFI is adaptable to store another filter parameter which is combinable with said base filter parameter to thereby enable further reduction of the dimension of the searchable data base.

2. A customisable data filter system according to claim 1, wherein said data filter parameter is a reference to said data filter parameter.

3. A method of customising a Portable Customisable data Filter and Interface (PCFII adapted to reduce a database search space, using a Portable Customisable User Interface (PCUI), wherein the PCFI and the PCUI respectively comprise a programmable smartcard providing a user interface including spatially distributed user selectable icons made visible on a surface of the smartcard, wherein the user selectable icons are operable using a smartcard reader into which the smartcard is inserted, wherein the reader has a touch screen adapted to allow user viewing and selection of said icons of the inserted smartcard; said method comprising steps of:
   interfacing a customising system to the PCFI and the PCUI using respective said smartcard readers;
   identifying in user interaction with the touch screen of the smartcard reader into which the PCUI has been inserted, an icon selected by a user on the inserted smartcard, said selected icon being associated with a corresponding user instruction; and
   programming the PCFI by means of said user instruction being input to the customising system using the user interface of the PCUI.

4. A method according to claim 3, wherein said programmable smartcard of said PCUI stores a data filter, and
   said programming step programs said programmable smartcard of said PCFI on the basis of the data filter.

5. A method of customising a Portable Customisable data Filter and Interface (PCFM comprising a programmable smartcard providing a user interface including spatially distributed user selectable icon made visible on a surface of the smartcard, wherein the user selectable icons are operable using a smartcard reader into which the smartcard is inserted, wherein the reader has a touch screen adapted to allow user viewing and selection of said icons of the inserted smartcard, the PCFI being adapted to reduce a database search space; the method comprising the steps of:
   interfacing a customising system to the PCFI using said smartcard reader;
   identifying in user interaction with the touch screen of the smartcard reader into which the PCFI has been inserted, an icon selected by a user on the inserted smartcard, said selected icon being associated with a corresponding user instruction; and
   programming the PCFI by means of said user instruction being input to the customising system using the user interface of the PCFI.

6. A method according to claim 5, further comprising the steps of:
   displaying customisation interface display on a screen of the customising system on the basis of data filter stored in the PCFI; and
   modifying the customisation interface display by the user selection,
   wherein when the predetermined icon displayed in the customisation interface display is instructed by the user, said programming step is performed.

7. A method according to claim 6, wherein the customisation interface display includes map information, and
   the database search space is reduced on the basis of the map information.

8. A Portable Customisable data Filter and Interface (PCFI) adapted to reduce a database search space, said PCFI comprising:
   a programmable smartcard providing a user interface including at least one icon made visible on a surface of the smartcard, wherein the at least one icon is operable using a smartcard reader into which the smartcard is inserted, wherein the reader has a touch screen adapted to allow user viewing a selection of said at least one icon of the inserted smartcard, the reader being adapted to identify said at least one icon selected by a user on the inserted smartcard in user interaction with said touch screen;
   a first data filter parameter adapted to define the reduced said search space; and a first rule adapted to define a second data filter parameter dependent upon the first data filter parameter.

9. A PCFI according to claim 8, wherein the first data filter parameter is a reference to the first data filter parameter.

10. A PCFI according to claim 8, wherein said first rule comprises at least one of:
- a boolean relationship applicable to said first data filter parameter; and
- a learning function operable upon the first data filter parameter in conjunction with a baseline parameter.

11. A PCFI according to claim 10, wherein the first data filter parameter comprises first and second data filter parameters.

12. A method of reducing a dimension of a searchable data base, and performing at least one of a database search and a data item selection, in relation to a correspondingly reduced search space, said method comprising steps of:
- configuring a Portable Customisable data Filter and Interface (PCFI) comprising a programmable smartcard adapted to store at least a data filter parameter, and further adapted to provide a user interface by means of spatially distributed user selectable icons made visible on a surface of the smartcard, wherein said icons are operable using a smartcard reader into which the smartcard is inserted, wherein the reader has a touch screen adapted to allow user viewing and selection of said icons of the inserted smartcard, the reader being adapted to identify an icon selected by a user on the inserted smartcard in user interaction with said touch screen;
- interconnecting the PCFI to a searchable database;
- selecting one or more of said user selectable icons;
- defining the reduced search space dependent upon said filter parameter;
- performing at least one of a database search and a data item selection, in relation to said reduced search space, dependent upon said selection, wherein said defining step comprises sub-steps of:
- reading the filter parameter, being a base filter parameter, from the PCFI;
- applying the base filter parameter to the searchable database thereby to define the reduced search space; and wherein the step of performing one or more of a database search and a data item selection is followed, if further search space reduction is desired, by further step of:
- reading another filter parameter from the PCFI;
- combining said other filter parameter with said base filter parameter; and
- applying the combined filter parameters to the reduced search space thereby to define a further reduced search space.

13. A method of reducing a dimension of a searchable database according to claim 12, whereby said data filter parameter is a reference to said data filter parameter.

14. A computer readable medium for storing a program for apparatus which reduces a dimension of a searchable data base and performs one or more of a database search and a data item selection, in relation to a correspondingly reduced search space, said program comprising:
- code for a configuring step for configuring a Portable Customisable data Filter and Interface (PCFI) comprising a programmable smartcard adapted to store at least a data filter parameter, and further adapted to provide a user interface by means of spatially distributed user selectable icons made visible on a surface of the smartcard, wherein the icons are operable using a smartcard reader into which the smartcard is inserted, wherein the reader has a touch screen adapted to allow user viewing and selection of said icons of the inserted smartcard, the reader being adapted to identify an icon selected by a user on the inserted smartcard in user interaction with said touch screen;
- code for an interconnecting step for interconnecting the PCFI to a searchable database;
- code for a selection step responsive to selection of one or more of said user selectable icons;
- code for a defining step for defining the reduced search space dependent upon said filter parameter; and
- code for a database searching step and code for a data item selection step for performing at least one of a database search and a data item selection, in relation to said reduced search space, dependent upon said selection.

15. A computer readable medium according to claim 14, wherein said data filter parameter is a reference to said data filter parameter.

16. A Portable Customisable data Filter and Interface (PCFI) adapted to reduce a database search space, the PCFI comprising:
- a programmable smartcard that is operable using a smartcard reader to which the smartcard is connected, the smartcard being adapted to provide a user-interface by means of spatially distributed user selectable icons made visible on a surface of the smartcard, wherein the icons are operable using a smartcard reader into which the smartcard is inserted, wherein the reader has a touch screen adapted to allow user viewing and selection of said icons of the inserted smartcard, the reader being adapted to identify an icon selected by a user on the inserted smartcard in user interaction with said-touch screen;
- a base data filter parameter stored in a memory of the smartcard;
- wherein when the PCFI is coupled to a database using the reader the search space of the database is reduced to a reduced search space according to the base data filter parameter; said PCFI further comprising:
- a user interface including an icon made visible on a surface of the smartcard, wherein the icon is operable using the smartcard reader; and
- a second data filter parameter associated with the icon and stored in the memory; wherein selection of the icon associated with the second data filter parameter causes the reduced search space established by the base data filter parameter to be further reduced in accordance with to the second data filter parameter.

* * * * *

UNITED STATES PATENT AND TRADEMARK OFFICE
CERTIFICATE OF CORRECTION

| | | |
|---|---|---|
| PATENT NO. | : 7,092,935 B2 | |
| APPLICATION NO. | : 09/788398 | |
| DATED | : August 15, 2006 | |
| INVENTOR(S) | : Zhenya Alexander Yourlo et al. | |

It is certified that error appears in the above-identified patent and that said Letters Patent is hereby corrected as shown below:

COVER PAGE:
(56) References Cited U.S. PATENT DOCUMENTS
Insert the following: -- 5,973,475 10/1999 Combaluzier
                         5,353,016 10/1994 Kurita et al. --

COLUMN 4:
Line 64, "descriptive." should read -- description. --.

COLUMN 9:
Line 57, "<name>" should read -- </name> --.

COLUMN 14:
Line 9, "User" should read -- user --;
Line 18, "PCs is" should read -- PCs, which is --;
Line 19, "information" should read -- information, --; and
Line 30, "modern" should read -- modem --.

COLUMN 15:
Line 28, "of," should read -- of --;
Line 32, "(PCFM)" should read -- (PCFI) --; and
Line 61, "(PCFII" should read -- (PCFI) --.

COLUMN 16:
Line 20, "(PCFM" should read -- (PCFI) --; and
Line 22, "icon" should read -- icons --.

COLUMN 17:
Line 14, "data" should read -- data- --; and
Line 58, "data base" should read -- database --.

UNITED STATES PATENT AND TRADEMARK OFFICE
CERTIFICATE OF CORRECTION

PATENT NO. : 7,092,935 B2
APPLICATION NO. : 09/788398
DATED : August 15, 2006
INVENTOR(S) : Zhenya Alexander Yourlo et al.

It is certified that error appears in the above-identified patent and that said Letters Patent is hereby corrected as shown below:

<u>COLUMN 18</u>:
Line 33, "user-interface" should read -- user interface --;
Line 41, "said-touch" should read -- said touch --; and
Line 58, "to" should be deleted.

Signed and Sealed this

Twelfth Day of June, 2007

JON W. DUDAS
*Director of the United States Patent and Trademark Office*